United States Patent Office 3,105,081
Patented Sept. 24, 1963

3,105,081
STABILIZATION OF 6,7,8,9,10,10-HEXACHLORO-1, 5,5a,6,9,9a-HEXAHYDRO-6,9-METHANO-2,4,3-BENZODIOXATHIEPIN-3-OXIDE WITH WATER
Richard H. Kimball, Lewiston, and Edward Leon, Tonawanda, N.Y., assignors to Hooker Chemical Corporation, Niagara Falls, N.Y., a corporation of New York
No Drawing. Filed Mar. 23, 1959, Ser. No. 800,912
10 Claims. (Cl. 260—327)

This invention relates to a process for stabilizing 6,7,8,9,10,10 - hexachloro - 1,5,5a,6,9,9a - hexahydro-6,9-methano-2,4,3-benzodioxathiepin-3-oxide, hereinafter referred to as Thiodan, which is a registered trademark of Farbwerke Hoescht Aktiengesellschaft, and to the new and stable compositions which are produced thereby.

"Thiodan" may be represented structurally as follows:

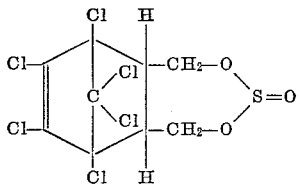

"Thiodan" may best be prepared by the method disclosed in copending application S.N. 733,500 filed May 7, 1958, now U.S. Patent 2,983,732. Therein cis-2-buten-1,4-diol is slowly added to an excess of hexachlorocyclopentadiene in the presence of a compound selected from the group consisting of alkali metal carbonates, alkaline earth metal carbonates, epoxides, and mixtures thereof, and in the presence of a solvent. The Diels-Alder adduct thus obtained is then reacted with thionyl chloride to give "Thiodan."

"Thiodan" finds utility primarily as a herbicide, fungicide, and insecticide. "Thiodan" may also be used for protecting wood, paper, textiles and leather. Furthermore, "Thiodan" may be used as a disinfectant.

Commercial "Thiodan" is a solid which is susceptible to decomposition on storage under normal conditions. It should be pointed out that "Thiodan" differs markedly from other chlorinated Diels-Alder type insecticides in that it contains a sulfite ring. This presents unique stabilization problems. The rate of decomposition varies from an insignificant degree to several percent per week. The decomposition products of "Thiodan" include 1,4,5,6,7,7 - hexachloro-2,3 - bis(hydroxymethyl) - bicyclo-(2.2.1)-heptene-5, also known as 1,4,5,6,7,7-hexachloro-bicyclo-(2.2.1)-hept-5-ene-2,3-dimethanol, and sulfur dioxide. Hydrogen chloride is evolved from some samples of "Thiodan." These decomposition products have little, if any, pesticidal activity of the type exhibited by "Thiodan." The formation of 1,4,5,6,7,7-hexachloro-2,3-bis-(hydroxymethyl)-bicyclo-(2.2.1)-heptene-5 is undesirable because of its slight solubility in the solvents generally used in "Thiodan" formulations. The formation of sulfur dioxide and hydrogen chloride are undesirable because of their disagreeable odors. In addition, hydrogen chloride destroys the containers normally used to store "Thiodan"; for example, standard fiber drums containing commercial "Thiodan" were weakened after thirty days to such an extent that the "Thiodan" spilled out onto the floor and the lacquered metal lids were severely corroded.

It is the primary object of this invention to provide a stable "Thiodan" composition.

It is a further object of the present invention to provide a method for preventing the loss of pesticidal activity of "Thiodan" during storage.

It is a still further object of the present invention to provide a method for preventing the formation of insoluble 1,4,5,6,7,7-hexachloro-2,3-bis(hydroxymethyl)-bicyclo-(2.2.1)-heptene-5.

It is a still further object of the present invention to provide a method for preventing the formation of undesirable gases such as sulfur dioxide and hydrogen chloride.

A further object of the present invention is to provide a method for preventing the disintegration of "Thiodan" storage containers.

Another object of the present invention is to provide a method for prolonging the pesticidally-effective life of "Thiodan" after field application.

Further objects and advantages of the present invention will appear herein.

In accordance with the present invention it has been found that "Thiodan" is stabilized by contacting "Thiodan" and water at a temperature of from about thirty degrees centigrade to about one hundred and seventy degrees centigrade, wherein at least about five percent of water is used based on the weight of "Thiodan." The water may be employed in either the liquid state, partially vaporized state, or completely vaporized state. The stabilized "Thiodan" is then separated from any remaining water.

The time of reaction may vary from about five minutes to about twenty-four hours. At least five percent of water should be used based on the weight of "Thiodan."

When liquid water is employed a liquid reaction diluent may or may not be used. Any diluent may be suitably employed providing it is unreactive under the conditions of the reaction and provided that the "Thiodan" is soluble therein. Toluene is preferred for this purpose, although others may be profitably employed, such as benzene, xylene, carbon tetrachloride, etc. The stabilized "Thiodan" may then be separated from solution by any method known to the art.

In order to determine the extent of decomposition of "Thiodan," various tests are utilized. Hydrogen chloride fumes in moist air; hence, this was a basis for a qualitative test for this gas over the "Thiodan" samples. Odor is a good indication of the presence of both sulfur dioxide and hydrogen chloride; hence, an odor determination has been made. 1,4,5,6,7,7-hexachloro-2,3-bis-(hydroxymethyl)-bicyclo-(2.2.1)-heptene-5 is very insoluble in xylene, and this determination of insolubles is an excellent quantitative measure of this decomposition product.

The active chlorine content of "Thiodan" is a good measure of stability. This test measures the amount of chlorine which is hydrolyzed from a sample of "Thiodan" by stirring "Thiodan" in toluene solution with hot water for thirty minutes. The chloride is titrated and calculated (on the basis of "Thiodan") in parts per million (p.p.m.) of active chlorine removed from a sample of "Thiodan." Chemically pure recrystallized "Thiodan" releases no chlorine by this procedure, while the crude unstabilized material gives from about fourteen hundred to seventy-five hundred p.p.m., typically three thousand to five thousand p.p.m. The "Thiodan" stablized by the process of the present invention gives at most one thousand p.p.m., and generally from fifty to one hundred and fifty p.p.m. Therefore, it is believed that the chloride is produced by the hydrolysis of the unstable impurities which are responsible for the evolution of hydrogen chloride, said hydrogen chloride causing the deterioration of the containers in storage.

The test is invariably carried out by stirring together about eighty grams of "Thiodan," fifty cubic centimeters of toluene and fifty cubic centimeters of water for thirty minutes at eighty to ninety degrees centigrade. The two layers are then separated and the water layer is acidified with nitric acid and titrated for chloride by the Volhard method. The chloride content is then calculated as parts per million of active chlorine on the basis of "Thiodan."

The following examples will serve to illustrate the present invention.

Example 1

Four hundred grams of "Thiodan" fumed badly and emitted a strong odor of hydrogen chloride and sulfur dioxide. It assayed 94.0 percent "Thiodan" and contained seventy-two hundred p.p.m. of active chlorine by the active chlorine test. The sample was melted, held between one hundred and one hundred and five degrees centigrade at about thirty-five millimeters pressure and steam passed therethrough. The steam was preheated to about one hundred degrees centigrade after entering the vacuum system but before contact with the batch. After two hours the steam was stopped and dry nitrogen passed through the "Thiodan" for thirty-five minutes under the same conditions. The purpose of the nitrogen was to dry out all traces of residual moisture.

The stabilized "Thiodan" product thereby obtained was cast and bottled. It assayed 95.3 percent "Thiodan," and contained seven hundred and twenty-three p.p.m. of active chlorine and no xylene insolubles were present. With 0.5 percent by weight added formamide, it remained quite bland and free from hydrogen chloride fumes.

Example 2

Six hundred seven grams of "Thiodan" fumed badly and emitted a strong odor of hydrogen chloride and sulfur dioxide. The sample was melted, and held between one hundred and fifty and one hundred and sixty degrees centigrade at about thirty-five millimeters pressure and a moderate current of dry nitrogen was bubbled through for one hour.

The "Thiodan" thereby obtained was cast and bottled. It fumed as badly as before treatment, and the hydrogen chloride evolved corroded the metal jar cover very badly. This clearly shows that heat alone or stripping off volatile products alone without contact with water will not stabilize "Thiodan."

Example 3

Four hundred fifty grams of "Thiodan" fumed badly, and emitted a strong odor of hydrogen chloride and sulfur dioxide. It contained only a trace of xylene insolubles and assayed 95.6 percent "Thiodan." The sample was melted, held between one hundred and one hundred and five degrees centigrade at about six hundred to seven hundred millimeters pressure and steam passed therethrough. The steam was preheated to about one hundred degrees centigrade after entering the vacuum system but before contact with the batch. The steam was bubbled through for fifty minutes during which time much water remained condensed on the walls of the flask and admixed as small droplets of liquid water throughout the "Thiodan." About two hundred and ninety cubic centimeters of water was collected in the receiver. The steam was then stopped and dry nitrogen passed through the "Thiodan" while the pressure was decreased to about fifty-five to sixty millimeters at a temperature of one hundred and five to one hundred and ten degrees centigrade. The nitrogen current was continued for about thirty minutes to remove the last traces of water.

The stabilized "Thiodan" product thereby obtained was cast and bottled. It assayed 93.4 percent "Thiodan" and contained no xylene insolubles. It remained free from hydrogen chloride fumes.

Example 4

Sixty-six grams of "Thiodan" fumed badly and emitted a strong odor of hydrogen chloride and sulfur dioxide. It assayed 95.8 percent "Thiodan," contained thirteen hundred p.p.m. of active chlorine by the active chlorine test, and only traces of xylene insolubles were present. The sample was melted, held between ninety and ninety-three degrees centigrade at about two hundred mm. pressure and steam passed therethrough. The steam was preheated to about one hundred degrees centigrade after entering the vacuum system but before contact with the sample. After six hours the steam was stopped and a current of air passed through the "Thiodan" for about thirty minutes to remove the last traces of water. The steam was condensed and mounted to twenty-seven hundred milliliters of water.

The stabilized "Thiodan" product thereby obtained was cast and bottled. It assayed 96.0 percent "Thiodan," contained two hundred and ninety-eight p.p.m. of active chlorine and only traces of xylene insolubles were present. The sample remained free from hydrogen chloride fumes.

Example 5

One hundred grams of "Thiodan" fumed badly and emitted a strong odor of hydrogen chloride and sulfur dioxide. It assayed 96.7 percent "Thiodan" and contained no xylene insolubles. In addition the sample had an active chlorine content of fourteen hundred parts per million. The sample was melted, held at one hundred degrees centigrade and twenty-five cubic centimeters of hot water was added. The mixture was stirred moderately for about five minutes. A stream of nitrogen was then bubbled through the batch, the temperature was raised to one hundred and ten degrees centigrade and a vacuum was applied to distill the water out slowly over a period of about fifteen minutes. When full vacuum was reached, nitrogen bubbling was continued at one hundred and ten to one hundred and twenty degrees centigrade for one-half hour to remove the last traces of water.

The stabilized "Thiodan" product thereby obtained was cast and bottled. It assayed 96.2 percent "Thiodan" and contained no xylene insolubles. It remained free from hydrogen chloride fumes and had an active chlorine content of ninety parts per million.

Example 6

Three hundred grams of "Thiodan" fumed badly and emitted a strong odor of hydrogen chloride and sulfur dioxide. It assayed 98.5 percent "Thiodan" and contained no xylene insolubles. In addition, the sample had an active chlorine content of fifteen hundred and forty parts per million. The "Thiodan" was dissolved by heating in two hundred cubic centimeters of toluene and thirty cubic centimeters of water was added. The mixture was stirred for one-half hour at eighty to ninety degrees centigrade. A current of nitrogen was bubbled through while the heat was raised, and a vacuum slowly increased so as to slowly distill toluene and water from the batch while maintaining the "Thiodan" in a molten state. The batch was finally heated at one hundred and ten to one hundred and twenty degrees centigrade under full vacuum to remove the last traces of moisture. One-half of the stabilized "Thiodan" product thereby obtained was cast and bottled. To the other half 0.5 percent by weight of formamide was added before casting. The half without formamide assayed 96.1 percent "Thiodan" and contained no xylene insolubles. On storage it fumed slightly of hydrogen chloride and sulfur dioxide. The half with formamide added remained bland and free from fumes. Both portions contained essentially the same amount of active chlorine, i.e., one hundred thirty-five and one hundred twenty-five p.p.m. respectively.

Example 7

Three hundred fifty-one grams of "Thiodan" fumed badly and emitted a strong odor of hydrogen chloride and sulfur dioxide. In addition, the sample had an active chlorine content of twenty-three hundred parts per million. The "Thiodan" was dissolved by heating in two hundred cubic centimeters of toluene and stirred vigorously with two hundred cubic centimeters of water at eighty to ninety degrees centigrade for one hour. After settling, the "Thiodan" layer, consisting of "Thiodan" dissolved in toluene, was drawn off and the toluene and last traces of water were removed from the "Thiodan" layer by vacuum distillation.

The stabilized "Thiodan" product thereby obtained was cast and bottled. It gave off small amounts of sulfur dioxide, but remained free from hydrogen chloride, no xylene insolubles were present and it had an active chlorine content of ninety parts per million.

*Example 8*

One hundred sixty grams of "Thiodan" fumed badly and emitted a strong odor of hydrogen chloride and sulfur dioxide and contained no xylene insolubles. In addition, the sample had an active chlorine content of fourteen hundred parts per million. The "Thiodan" was dissolved by heating in one hundred cubic centimeters of toluene and one hundred cubic centimeters of water added. The mixture was stirred vigorously for fifteen minutes at eighty to ninety degrees centigrade. The water layer was separated and the treatment with one hundred cc. of fresh water was repeated six times in the same way. The following amounts of chloride, calculated on the basis of "Thiodan," were found in the six successive water layers: nine hundred and ten p.p.m., three hundred and thirty p.p.m., seventy-eight p.p.m., thirty-three p.p.m., twenty-seven p.p.m., and twenty-nine p.p.m. The toluene was then distilled off from the "Thiodan" under vacuum.

The stabilized "Thiodan" product thereby obtained was cast and bottled. It remained bland, free from hydrogen chloride fumes and no xylene insolubles were present.

The stable "Thiodan" produced by the full ninety-minute treatment contained by analysis 95.9 percent "Thiodan" and 4.1 percent impurities. The unstable "Thiodan" before treatment contained 96.7 percent "Thiodan" with only 3.3 percent impurities. This experiment shows that the source of the large amount of active chlorine removed during the treatments with water must be unstable impurities, rather than "Thiodan" itself. This experiment also shows that the stabilization has not been accomplished by purification of the "Thiodan" since there is a higher content of impurities in this case in the stable "Thiodan" than in the unstable "Thiodan." It is believed that the process of the present invention changes unstable, harmful impurities to stable, harmless impurities, thus avoiding the costly, impracticable purification methods, such as recrystallization, which are known to the prior art. Purification can only accomplish stabilization by removal of impurities, raising the assay of the resulting "Thiodan" close to one hundred percent. This is an expensive and cumbersome procedure and is accompanied by high losses of the "Thiodan."

The treatment with successive portions of hot water is very similar to a continuous countercurrent treatment of "Thiodan" with hot water and demonstrates that stabilization can be achieved by the use of such continuous methods familiar to those skilled in the art.

It will be noted that excellent results are obtained when the process of the present invention is used in conjunction with the process disclosed and claimed in copending application S.N. 800,951, filed of even date herewith. Therein stabilized "Thiodan" compositions are obtained by adding thereto relatively small amounts of a compound containing the radical

In addition the process of the present invention may be advantageously used in conjunction with the process disclosed and claimed in copending application S.N. 800,952, filed of even date herewith. Therein "Thiodan" is stabilized by agitating molten "Thiodan" with a small amount of a saturated alcohol containing from one to five carbon atoms and a small amount of a compound containing the radical

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalence of the claims are intended to be embraced therein.

We claim:

1. A process for stabilizing 6,7,8,9,10,10-hexachloro-1,5,5a,6,9,9a-hexahydro - 6,9 - methano-2,4,3-benzodioxathiepin-3-oxide which comprises contacting molten 6,7,8,-9,10,10 - hexachloro - 1,5,5a,6,9,9a - hexahydro - 6,9-methano - 2,4,3 - benzodioxathiepin-3-oxide with at least about 5% by weight of water at a temperature up to about 170° C., the temperature of the water being sufficiently high so as to maintain the 6,7,8,9,10,10-hexachloro-1,5,5a,-6,9,9a-hexahydro-6,9-methano-2,4,3 - benzodioxathiepin-3-oxide in the molten state and separating the thus stabilized product from any remaining water.

2. The processes claimed in claim 1 wherein the water is introduced in one portion.

3. The processes claimed in claim 1 wherein the water is introduced in several portions.

4. The processes claimed in claim 1 wherein the water is introduced continuously.

5. A stabilized 6,7,8,9,10,10-hexachloro-1,5,5a,6,9,9a-hexahydro-6,9-methano-2,4,3 - benzodioxathiepin - 3-oxide prepared by contacting molten 6,7,8,9,10,10-hexachloro-1,5,5a,6,9,9a-hexahydro-6,9-methano-2,4,3 - benzodioxathiepin-3-oxide with at least about 5% by weight of water at a temperature up to about 170° C., the temperature of the water being sufficiently high so as to maintain the 6,7,8,9,10,10 - hexachloro - 1,5,5a,6,9,9a - hexahydro-6,9-methano - 2,4,3 - benzodioxathiepin-3-oxide in the molten state, and separating any remaining water from the thus-stabilized product.

6. A process for stabilizing 6,7,8,9,10,10-hexachloro-1,5,5a,6,9,9a- hexahydro - 6,9 - methano - 2,4,3 - benzodioxathiepin-3-oxide which comprises dissolving 6,7,8,9,10, 10-hexachloro - 1,5,5a,6,9,9a - hexahydro - 6,9 - methano-2,4,3-benzodioxathiepin-3-oxide in an organic solvent in which it is soluble and which is unreactive under the conditions of the process, contacting the thus-obtained solution with at least about 5% by weight of water at a temperature of at least about 30° C. and separating the thus-stabilized product from any remaining water.

7. The processes claimed in claim 6 wherein the water is introduced in one portion.

8. The processes claimed in claim 6 wherein the water is introduced in several portions.

9. The processes claimed in claim 6 wherein the water is introduced continuously.

10. A stabilized 6,7,8,9,10,10-hexachloro-1,5,5a,6,9,-9a - hexahydro - 6,9 - methano - 2,4,3 - benzodioxathiepin-3-oxide prepared by dissolving 6,7,8,9,10,10-hexachloro-1,5,5a,6,9,9a-hexahydro-6,9-methano - 2,4,3 - benzodioxathiepin-3-oxide in an organic solvent in which it is soluble and which is unreactive under the conditions of the process, contacting the thus-obtained solution with at least 5% by weight of water at a temperature of at least about 30° C. and separating the thus-stabilized product from any remaining water.

References Cited in the file of this patent

Hanna: Handbook of Agricultural Chemicals, second edition, page 337 (1958).